May 22, 1962 F. P. CIRONE ET AL 3,036,161

LINE CONCENTRATOR CONTROL CIRCUIT

Filed Oct. 26, 1959 4 Sheets-Sheet 1

INVENTORS F. P. CIRONE
J. A. HARR
T. N. LOWRY

BY S. E. Hollander

ATTORNEY

INVENTORS F. P. CIRONE
J. A. HARR
T. N. LOWRY
BY S. E. Hollander
ATTORNEY

May 22, 1962 F. P. CIRONE ETAL 3,036,161

LINE CONCENTRATOR CONTROL CIRCUIT

Filed Oct. 26, 1959 4 Sheets-Sheet 3

INVENTORS F. P. CIRONE
J. A. HARR
T. N. LOWRY

BY S. E. Hollander

ATTORNEY

LINE CONCENTRATOR CONTROL CIRCUIT

Filed Oct. 26, 1959 4 Sheets-Sheet 4

INVENTORS F. P. CIRONE
J. A. HARR
T. N. LOWRY
BY S. E. Hollander
ATTORNEY 3,036,161

LINE CONCENTRATOR CONTROL CIRCUIT

Frank P. Cirone, Dover, John A. Harr, Morris Plains, and Terrell N. Lowry, Boonton, N.J., assignors to Bell Telephone Laboratories, Incorporated, New York, N.Y., a corporation of New York Filed Oct. 26, 1959, Ser. No. 848,594
14 Claims. (Cl. 179—18)

This invention relates to telephone systems and more particularly to control circuits for two-stage subscriber line concentrator systems. The concentration of lines and the connection of a relatively larger number of substation lines to a relatively smaller number of switching paths has marked telephone switching since its earliest development.

In automatic telephone offices the first switching equipment through which the subscriber lines are connected "concentrates" the traffic to the remaining equipment in the central office. The latter equipment is not provided on a per substation line basis and instead, for economic reasons, is designed to handle the expected peak load at the required grade of service. This so-called first stage of concentration varies in different automatic switching systems and in the step-by-step system is embodied in the line finder while in the crossbar system it takes form in the connections and junctors between the line link frames and the trunk link frames from which connections extend to switching paths and common equipment in the central office.

Recent developments in the telephone switching art have demonstrated that decisive advantages flow from arrangements in which substation lines are concentrated at a point which is remote from the central office. In remote concentrator arrangements a lesser number of channels or trunks than the number of substation lines is utilized from the point of concentration to the central office. The economic benefits alone that derive from reduction of cable costs and other outside plant expenditures are so significant when remote line concentration is employed that a pronounced heightening of interest has developed in this field as has become apparent from the patent and related literature.

These recent advances in remote concentrator developments have been in large measure made possible by overcoming formidable obstacles in control and supervision of the remote switching equipment.

Prior art arrangements in the remote concentrator field, although wholly operative, are disadvantageous in a number of important considerations. For example, in areas of high population density or in areas where subscriber lines originate at a substantial distance from the central office a single stage of concentration (as employed by most prior art concentrators) may be inadequate since the trunks from the central office to the remote point of concentration, although less in number than the number of lines, may still be of considerable number. At all events, the length of the trunks to the central office where subscribers are grouped at a point considerably distant from the central office may be excessive since the point of concentration should be as close to the center of density of the subscribers as is feasible. Under these circumstances a two-stage contrator is highly advantageous.

Moreover, in certain other prior art arrangements, direct-current connections are made from the subscriber lines through the concentrator to the central office for supervisory and signaling purposes. In a two-stage concentrator arrangement, which impliedly includes substantial distances between a particular subscriber and the central office, direct-current connections give rise to a number of serious difficulties. For example, the switching network in the concentrators, i.e., the apparatus for connecting the lower level lines from the subscribers to the higher level links or trunks to the central office may be subjected to longitudinal currents induced from power lines and other sources of interference. Additional related disorders may result from the effects of cable leakage and differing direct-current earth potentials at the subscriber station and the central office. All of these factors militate against the quality and accuracy of signal transmission.

Certain prior art concentrators operate under heavy control traffic burdens. In this reference "control traffic" denotes the necessary signaling between the locale of concentration and the central office to transmit the required supervisory signals and network order signals that pass in each direction. In these concentrators, it was necessary to signal the central office concerning the state condition of a subscriber line each time the line is examined or scanned at the remote point. In a concentrator of the size proposed herein, this type of arrangement would constitute a grave handicap. In any concentrator, in fact, continuous supervisory signaling of the state condition of the line severely taxes the control facilities between the point of concentration and the central office. Thus, as an illustration, when a particular substation line is requesting service, it has been required in certain prior art devices to identify the service requesting unit and transmit the identification thereof to the central office.

Perhaps the most difficult problem arising from the use of remote line concentrators is the necessity for conveying switching information from the subscribers and remote concentrators to the central office. Since no direct path exists from the subscriber to the central office over which an examination may be made of the subscriber's line, it is of critical importance to provide other facilities or channels for informing the central office as to the state condition of the subscriber's line. While this has proved to be a burdensome problem in the case of single stage remote primary concentrators (and has been a significant factor in delaying the development of remote concentrators until recently), the additional obstacles in the transmission of control information which inhere in the use of a two-stage concentrator are literally compounded.

These difficulties are still further aggravated by the fact that in lieu of any direct-current or metallic path between the remote locales of concentration and the central office all control information must be passed on an alternating-current basis to avoid the difficulties alluded to above.

In certain prior art concentrators, the burden of transmitting control information from a remote concentrator to the central office has been measurably lightened by the use of synchronous counting arrangements. Under the latter circumstances a counter at a remote location is stepped in conjunction with a line examining device at the remote location and also in synchronism with a master counter at the central office. Thus, when a line is requesting service, for example, reference to the counter at the central office which is synchronized with the counter at the remote location will specifically identify the number of the subscriber line requesting service thereby obviating the necessity for transmitting information representing the identification of the subscriber line from the remote concentrator to the central office.

Although the control traffic burden is considerably eased, new problems in control traffic are generated. For example, one of the major difficulties attendant upon the operation of synchronous concentrators is the delay resulting from the propagation time involved in transmitting interrogation or advance signals from the central office to the remote primary concentrator, and the delay experienced in the opposite direction of transmission, i.e., the transmission of signals from the remote concentrators to the central office (in the same time slot) in response to the arrival of the interrogation signals. These delays are generally irreducible in specific physical circumstances, but to them must be added the delay which inheres in the operation of the remote equipment itself. It is apparent that the observation of the state condition of a particular line and the transmission of an indication representatvie thereof to the central office, in a sufficiently restricted time period to permit an appropriately rapid scanning rate, presents grave difficulties in the operation of remote concentrators.

Thus the advantages derived from synchronous operation of remote concentrators alluded to above are jeopardized when the restrictive time factors flowing therefrom are considered.

In the past, the operation and design of synchronous concentrator systems have focused almost exclusively on the maintenance of synchronism between local and remote counters and other equipment. This consideration has been motivated by the criticality of time synchronism as determining the correct identification of lines requesting service. In fact the safeguarding of synchronism between the central office and remote equipment has been of vital concern in past systems.

However, it will be demonstrated herein that through a departure from accepted principles of synchronous operation important advantages in eliminating the effect of reaction time of the remote equipment can be achieved.

It is therefore an object of this invention to provide for a synchronous concentrator system in which the delays occasioned by reaction time of the remote equipment are not a governing boundary factor in establishing the scanning rate.

It is an additional object of this invention to provide for a synchronous concentrator system in which certain desginated elements are expressly designed to operate simultaneously but out of step with other elements.

It is still another object of this invention to provide for out-of-step operation by a remote line scanner and line counter.

It is a further object of this invention to provide for scanning a subscriber line in one interrogation cycle and for transmitting an indication of the state condition of said line during a succeeding scanning cycle.

It is still a further object of this invention to provide for transmission of an interrogation pulse during one portion of an interrogation cycle and to transmit from the remote concentrator to the central office an indication of the state condition of the line scanned during a later portion of the scanning cycle.

These and other objects of the invention are realized in an illustrative embodiment in which the conventional difficulties experienced in operation of synchronous remote concentrators which result from the necessity of transmitting and receiving control pulses during a single interrogation cycle are obviated by forcing the equipment in the remote concentrator to operate out of step with other equipment in the central office. Thus in the illustrative embodiment a line scanner is cyclically operated one step ahead of a line mark selector. The line scanner also operates one step ahead of the line number counter at the remote concentrator. A counter at the central office and the counter at the remote concentrator are operated synchronously in step with each other.

By permitting the line scanner to operate one step ahead of the line counter, the effects of delays in the remote equipment are largely overcome. Thus, when the lien scanner is advanced to line 53 under the stimulus of an advance pulse or interrogation pulse which stepped the line counter to number 52, the state condition of the line 53 may be detected. No transmission of the state condition of line 53 takes place, however, until the next interrogation or advance pulse. When the succeeding pulse arrives at the remote concentrator the line scanner is advanced to position 54 and the line number counter is advanced to position 53. On the arrival of this pulse, the indication of the state condition of line 53 previously scanned, detected and stored at the remote concentrator is transmitted to the central office.

If it is assumed that the line 53 was in a service request condition, the appropriate indicating signal is relayed to the central office which takes action thereon. One of the first indicia that the central office will examine to process the service request will be the number of the central office counter at the time the service request was received in the central office. Since the counter is now at position 53 in the remote concentrator and since the counter in the central office is operated synchronously with that in the remote concentrator, and indication of line 53 as the identification of the service requesting line will be made. Thus, although the scanner is operated one step ahead of the line number counter, the correct identification in the central office is made.

By operating the line number counter and the scanner out of step in this manner, it is possible to reduce the delays occasioned by the propagation of an interrogation or advance signal to the remote concentrator and the reaction or delay time of the equipment located thereat to the delay attributable to propagation only. The delays in reaction time of the equipment in the remote concentrator occur in a cycle which is entirely separate from that in which a return of the response to the signal will be made to the central office.

In the embodiment in which the instant invention is incorporated, a remote network comprising two stages of line concentration is utilized. The primary stage which is connected to the subscribers' lines includes a full access switch for connecting a maximum of 58 subscribers to 10 links which latter join the remote primary concentrator to the remote secondary concentrator.

The secondary remote concentration stage provides for a maximum of 200 links which are connectable through a partial access switch to a maximum of 100 trunks which join the remote secondary concentrator to the central office. Both primary and secondary concentrators are intercoupled through transformers to provide an alternating-current coupling path. The latter facilities isolate the switching networks from the adverse effect referred to above that inheres in the use of continuous metallic transmission paths.

A connection through the remote network is established by selecting an idle path through both stages of concentration. Identification instructions for the selected link and trunk are transmitted to the remote concentrators with an order to effect the connection. Since the line number requesting service is available from the primary counter, both ends of each end-marked network stage of the remote primary and secondary switching networks are uniquely identified.

The remote network is released from the link side of the remote primary concentrator and at the trunk side of the remote secondary concentrator. Complete records of each connection are stored in a temporary route memory in the central office and thus the identification of a link and trunk to be disconnected is readily available. Closures and releases in the remote primary and secondary concentrator networks as well as failures are systematically recorded at the central office.

The lines and links are scanned on a periodic basis at the remote primary concentrator to detect service requests, answers and disconnects. When any one of these conditions obtains, an appropriate control signal is delivered to the central office on the advent of the next succeeding interrogation or advance pulse. A line number counter in each remote primary concentrator is stepped in discrete fashion one step behind the corresponding line scanner at the same location in response to the advance pulses as adverted to above.

A line mark selector is stepped in synchronism with the line number counter and is sequentially connectable to each of the lines to apply marking potential thereto.

A feature of this invention includes means for out-of-step operation of operating selected equipment in a synchronous remote concentrator system.

An additional feature of this invention includes facilities for operating a line scanner and a remote primary concentrator line counter in out-of-step relationship.

A further feature of this invention includes means for delaying the application of an advance pulse from the central office to the remote primary concentrator line counter until the output of the detector circuit connected to the line scanner is read out.

Still another feature of this invention includes facilities for operating a master line number counter in the central office in synchronism with each of the counters in the remote primary line concentrator.

A further feature of this invention includes means for stepping the master counter in the central office and for sampling the indication of a detector associated with the line scanner to transmit the state indication of the line previously scanned to the central office.

A further feature of this invention includes means for stepping a remote primary concentrator line counter in discrete fashion one step behind the associated line scanner at the same location.

These and other objects and features of the invention will be more fully comprehended from an examination of the following detailed description together with the drawing, in which:

FIG. 1 schematically depicts a portion of the remote primary concentrator including the line number counter and line scanner in accordance with one specific embodiment of our invention;

Although the instant invention may be utilized in general in synchronously operated systems wherein data is transmitted between distant locations for purposes of illustration, the invention has been incorporated in a two-stage remote line concentrator.

To establish the contextual setting in which the present invention is advantageously utilized, a general description of the two-stage concentrator system including the instant invention will be given followed by a detailed description of the operation of the instant invention.

To preserve clarity only that portion of the two-stage concentrator system essential to an understanding of the present invention has been shown in detail. For a comprehensive discussion of the operation of the two-stage concentrator system suitable for use in combination with the present invention reference may be made to an application of Harr et al., Serial No. 848,595, filed on even date herewith and to the applications and references therein referred to. In addition, for explanation of the operation of the detector circuit in the remote primary concentrator reference may be made to an application of Cirone et al., Serial No. 824,294, filed July 1, 1959.

For additional information concerning an electronic switching system suitable for use in conjunction with the present invention, reference may be made to Budlong et al., Patent 2,955,165 of October 4, 1960.

I. GENERAL DESCRIPTION

A. *Introduction*

Figure 5:
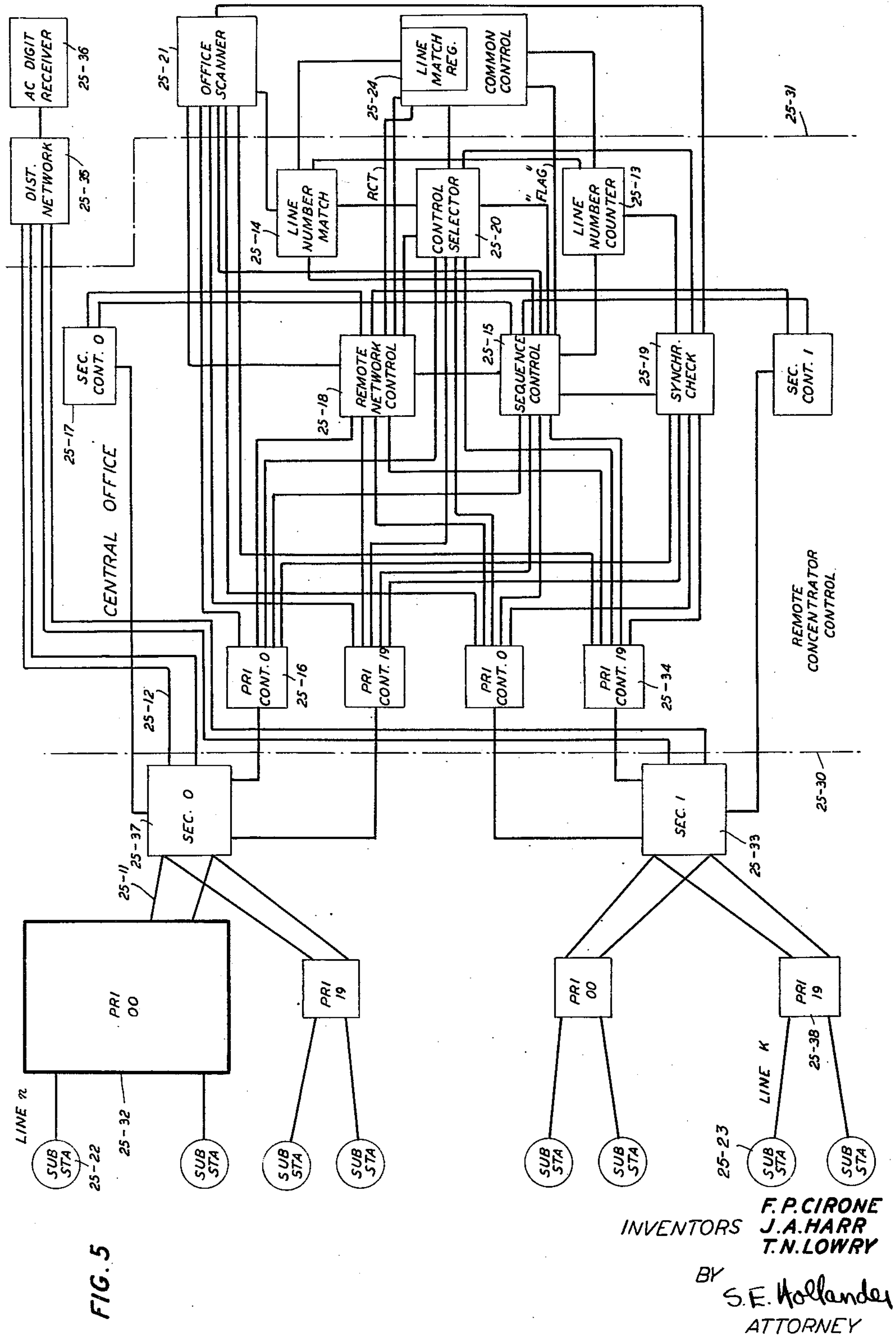
FIG. 5 is a block diagram of an illustrative system in which the present invention is embodied.

Referring now to FIG. 5 it may be observed that a number of substations 25–22, 25–23, etc., are connected over lines to the primary concentrators 25–32, 25–38, etc. and in turn the primaries are connected over links 25–11 to the secondary concentrators 25–37 and 25–33. From the secondaries a number of trunks 25–12 extend to the distributive portions of the switching network in the central office explained in greater detail in the Harr et al. application supra.

In FIG. 5 the remote equipment is indicated to the left of line 25–30 and the equipment within the central office to the right of line 25–30. The equipment between lines 30 and 31 constitutes the remote concentrator control, sometimes hereinafter referred to as RCC.

Figures 1, 4:
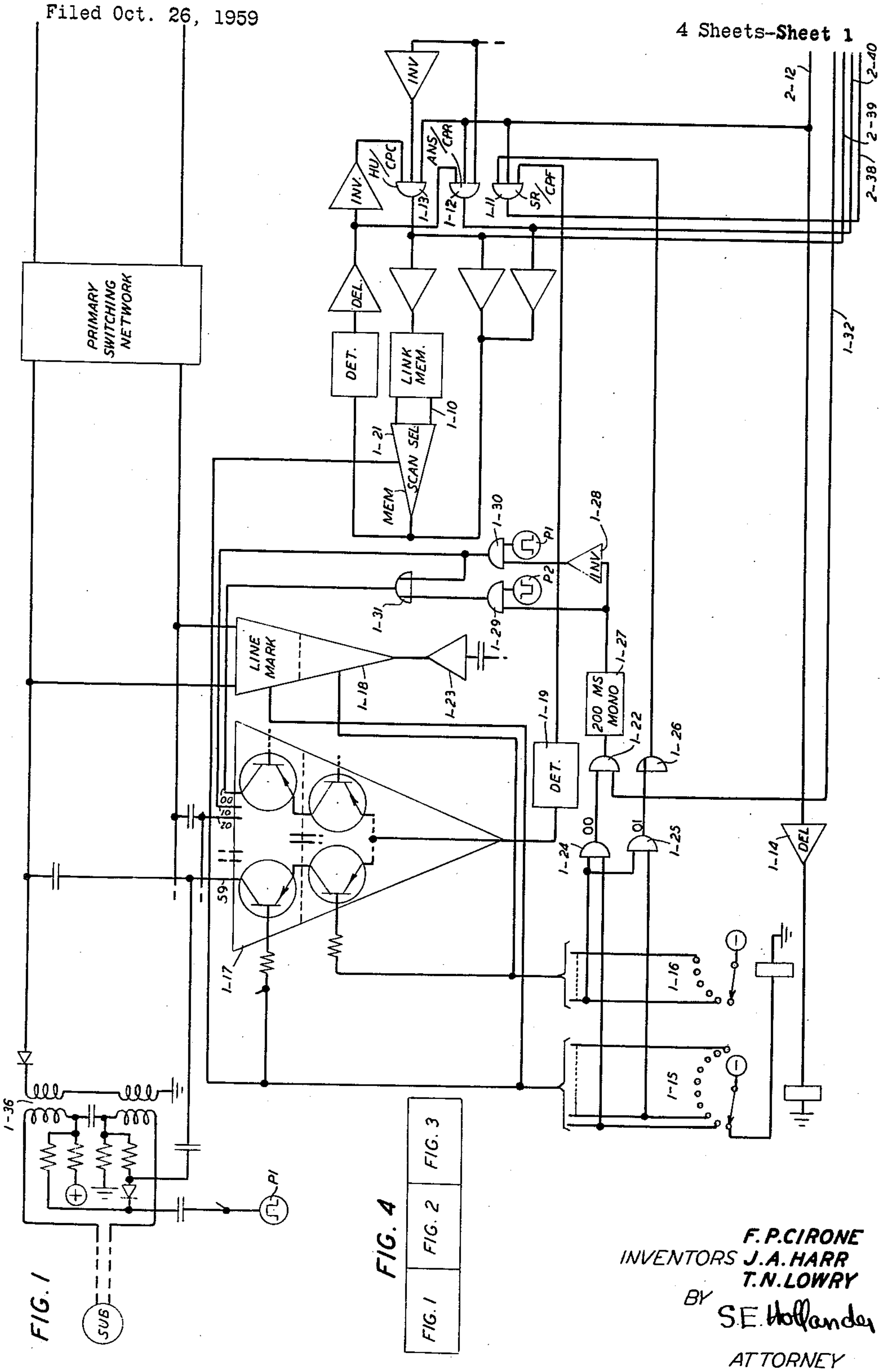
FIG. 4 shows the disposition of FIGS. 1 to 3 to disclose this embodiment of the present invention.

The over-all arrangement of the two-stage concentrator is based on a synchronous control system. Each of the lines is examined sequentially under control of a counter (not shown—see FIG. 1) at the remote primary. A master counter 25–13 at the central office is stepped in synchronism with the counters in the primaries. The line number counter 25–13 at the central office serves all of the counters in the remote primaries within a single group of concentrators.

The advantages which inhere in the use of a synchronous control system include the facile manner of identifying a customer making a service request. In a synchronous or other arrangements when a customer initiates a service request, it is necessary for the remote primary concentrator to forward information indicating the identity of the customer. By contrast, in the present arrangement it is essential only for the remote primary concentrator to forward control information to the central office indicating a service request. At the central office control equipment will examine the line number counter to identify the number of the line at the remote primary requesting service.

Since the over-all arrangement is sequential in nature, i.e., the remote counters are stepped one position at a time, the stepping speed is partially fixed by the transmission characteristics of the telephone cable extending the lines to the central office. Illustratively, a nominal time of 2 milliseconds has been allowed to transmit the advance pulse and wait for a reply control signal. Thus 500 pulses per second is the basic stepping rate.

As indicated in the application of Harr et al., Serial No. 848,595, filed on even date herewith, the concentrator control system in the central office has been provided with sufficient intelligence to properly administer and evaluate control pulses transmitted to and from the remote points without burdening the central office common control system with any but the most critical situations.

B. *Description of Major Components*

(1) *Sequence control.*—The sequence control 25–15 generally designates equipment which decides when it is necessary to send advance pulses to step the counters at the remote primaries.

Thus a typical decision by the sequence control circuit 25–15 is that no control pulses have been received from the primary concentrators indicating service requests, etc., and it is feasible to continue stepping and generating advance pules. The sequence control circuit includes a timing circuit adapted to measure an elapsed 2-millisecond interval and to observe whether any reply control signals have been received. If no service requests are received, the sequence control on its own initiative continues to step all of the counters in the remote primaries sequentially without assistance from the common control.

(2) *Line number match.*—The line number match circuit 25–14 has the general function of permitting the line number counter 25–13 to be stepped to a number requested by common control. If common control requires the line number counter to step to a particular number, it stores the wanted number in the line match register 25–24. The match logic circuit 25–14 includes comparator arrangements adapted to compare a number stored in the common control line match register 25–24 with the number appearing in the line number counter 25–13. At each step that the counter 25–13 takes the sequence control circuit 25–15 is informed as to whether a match condition has been requested and exists.

Thus if the line number counter is at line 10 and the line number match is looking for a match at 15, until the counter arrives at number 15, the line number match 25–14 will not provide a signal to the sequence control 25–15 which therefore continues to send out advance pulses to step all the counters. When line number 15 is reached, the match circuit 25–14 observes that the counter 25–13 is at the number that the common control is seeking and will produce an indication in the sequence control 25–15 which causes the sequence control to stop transmitting advance pulses and thereby to bring the counters in all the remote primaries to a halt.

(3) *"Flag."*—At this time the sequence control 25–15 provides an indication to the common control over a "flag" lead. The flag lead is a vital link between the concentrator control and common control since all information proceeding from the concentrator to common control is introduced by the flag lead. Common control examines the flag lead at periodic intervals as explained herein to observe if a flag indication is made.

When the sequence control 25–15 sets the flag no further independent action by the concentrator can proceed and all concentrator operations stop. Physically, as indicated in the Harr et al. application, the "flag" is a flip-flop in the common control circuit.

(4) *Primary control.*—The primary controls designated generally as 25–16, 25–34 are control circuits in the central office which are individually connected to each of the remote primary concentrators and, in effect, are terminals of signaling circuits which extend to the remote primary. The function of the control circuits is to receive and transmit information to and from the remote primaries using control pulses appropriate to the purpose. For example, when primary 00 (25–32) sends a control signal pulse representing a service request to the central office this signal will be received, over link 25–11 and additional signaling channels, in primary control 25–16 where it will be stored in a flip-flop. The primary control 25–16 also serves to provide control signals in an outgoing sense from the central office to a specific remote primary. Primary control 25–16 is, in effect, therefore, a signaling terminal for two-way transmission.

The common control equipment in the central office comprehends by reference to the particular primary control circuit indicating a service request, which of the forty remote primaries has indicated the request.

Thus, if the line number counter is at a count corresponding to line 35, and if at this time a service request corresponding to one of these lines in one of the primaries is made, it is insufficient for identification purposes to observe merely that line 35 is energized since that line may appear in any one of the forty primaries indicated in FIG. 5. However, common control by reference to the particular primary control 25–16, etc., in which the service request has been registered, can deduce which of the primaries contains the line requesting service.

(5) *Secondary control.*—The secondary control 25–17, etc. is related to the remote secondary concentrators in a manner which is analogous to the relationship between the remote primaries and the primary controls 25–16, etc. Secondary control 25–17 is thus, in effect, a signaling terminal. It contains equipment for transmitting control signals to the remote secondaries. This equipment includes facilities for shaping the control pulses transmitted to the secondaries and additional apparatus for receiving control pulses from the secondaries.

(6) *Remote network control.*—Remote network control 25–18 is utilized by the common control as an intermediary in transmitting information to the remote primary and secondary concentrators.

In view of the high repetition rate in common control in relation to that of the remote concentrator control (RCC), information delivered from the common control to RCC is delivered in parallel rather than in series. The function of remote network control 25–18 is to take information transmitted in parallel binary form from common control and convert it to control signals suitable for the remote primaries and secondaries. In addition, the remote network control 25–18 discerns which pulses must be transmitted at high speed over direct paths and which control information can be transmitted at slow rates over phantom channels as explained in the Harr et al. application.

Control 25–18 is utilized only when a specific order is to be executed by the remote switching networks and has no direct bearing on supervision of line circuits. When no supervisory changes are taking place in the lines the remote network control 25–18 is quiescent.

(7) *Control selector.*—The control selector 25–20 performs the local control functions necessary to control the RCC. It is used to set and reset flip-flops at specified locations within the remote concentrator control circuits under the supervision of common control. For example, when common control elects to inform the RCC equipment that a service request has been fulfilled and therefore the flip-flop representing the service request must be reset, it does this by energizing the control selector 25–20 which in turn resets the specific flip-flop.

By contrast, the remote network control 25–18 cannot affect local control equipment but only that equipment which is remote. In essence the control selector performs a local function in governing the action of control equipment in the central office which is not sufficiently critical to justify a direct bus connection to the common control.

As a further illustration, when common control elects to send instructions to remote network control 25–18 it prepares a parallel binary number which is gated into control 25–18. This information is sufficient to perform the necessary switching functions. However, due to logical circuit design considerations it is inappropriate for remote network control 25–18 to immediately perform functions based on the receipt of a parallel binary number from common control since the parallel digits may not arrive at precisely the same time. Instead, the information is gated into remote network control 25–18 in parallel, and time is permitted to elapse to insure full registration of all of the binary information. Subsequently, a gating signal will be supplied to remote network control 25–18 to start transmitting the information stored therein. The latter gating signal is supplied by common control through control selector 25–20 to remote network control 25–18.

It is therefore unnecessary to establish an inflexible time relationship between the RCC and common control.

(8) *Office scanner.*—The office scanner 25–21 is a scanner which examines directly connected (unconcentrated) substation lines and is not related to the scanning equipment at the remote primaries. The function of that portion of the office scanner 25–21 which is associated with the remote concentrators is to examine the primary controls 25–16, etc. and certain other flip-flops within the RCC to observe the particular signal information stored therein.

The points examined by office scanner 25–21 include such terminals as the supervisory registers or flip-flops in primary control 25–16 which indicate service request, hangup or answer conditions. Similar flip-flops connected to the sequence control 25–15 which indicate the motivation for a specific flag condition may be scanned by scanner 25–21. In this sense, office scanner 25–21 is treated as a part of common control for the purpose of advising common control as to the causes for flag signals delivered to common control. It is significant to observe that although office scanner 25–21 may scan direct lines, as explained herein and in the patent of Budlong et al. supra, it cannot perceive information about a specific remotely concentrated line. Its reach extends only as far as the RCC.

Thus the office scanner may see an indication of a service request in primary control 25–16 but this is not uniquely identified with a particular subscriber's line. In short, the office scanner supplies information to the common control about the concentrator system generally but not in relation to a particular remotely concentrated line. All of the individual line scanning is done in the remote primaries as will be explained infra.

C. *General Description of Typical Call*

(1) *Off-hook condition precipitates service request.*—When subscriber 25–22 (connected to line *n*) goes off-hook the scanner (shown in FIG. 1) in the remote primary will observe the service request when the counter advances to line number *n*. A pulse signifying a service request is sent by the remote primary 25–32 over phantom channels which go directly to primary control 25–16 at the central office. Although these phantom channels are geographically routed through the remote secondary 25–37, the remote secondary performs no useful function with regard thereto. When the service request pulse arrives in primary control 25–16 it sets a flip-flop signifying this condition. This in turn produces a flag indication to common control via sequence control 25–16 and at the same time governs sequence control 25–15 to discontinue the train of advance pulses. Accordingly, all local activity in the RCC is halted.

The service request pulse at the primary was initiated in view of the scanner having arrived at a terminal (connected to line *n*) signifying a service request and the subsequent arrival of an advance pulse at the remote primary.

It is understood, of course, that service requests or other supervisory indications may be present in other lines and registered in the corresponding primary controls. The result is the same, i.e., producing a flag indication for common control.

(2) *Originating connection to calling customer.*—After determining that it is a genuine service request the first major function of common control is to provide a connection between the central office and the calling substation in order that the subscriber may key the digits of the called number. Common control by reference to a memory selects an appropriate route to effect the connection which may illustratively include link 25–11 and trunk 25–12 and delivers this information to remote network control 25–18 after recording it in the memory. The instructions from common control to remote network control 25–18 dictate that link 25–11 and trunk 25–12 be utilized to effect the condition. Having given this information to remote network control 25–18, common control dictates to the control selector 25–20 that it energize network control 25–18 to start sending the necessary control impulses to effect the connection. Once energized, network control 25–18 proceeds under its own initiative for approximately 15 milliseconds to transmit the information. It operates on the information conveyed from common control to deliver the appropriate control intelligence to both the remote primary 25–32 and the remote secondary 25–37 through the terminals of primary control 25–16 and secondary control 25–17.

It may be observed at this time that it is unnecessary to transmit through network control 25–18 the line number of the calling line since when the counter arrived at the line having a service request it conditioned a line selector (shown in FIG. 1) in remote primary 25–32 to provide a connection to that line as explained herein. The counter thus addresses the line scanner and the line network control selector simultaneously (although to two separate line terminals as indicated supra).

After the control selector 25–20 has been actuated by common control to initiate operation of the remote network control 25–18, the control selector prepares a path to reset the flag condition originated by sequence control 25–15.

When common control actuated sequence control 25–20 to energize network control 25–18, the flag in sequence control 25–15 was removed since it would be inefficient for common control to observe a flag and not be able to seize remote network control 25–18 for the purpose of effecting the necessary connections. Therefore, whenever remote network control 25–18 is operative the flag indication to common control is inhibited.

Since the flag was removed when remote network control 25–18 was energized and the service request flip-flop in primary control 25–16 was reset by control selector 25–20, sequence control 25–15 can return to its primary function of generating advance pulses as soon as remote network control 25–18 has completed transmission of the order information stored therein. In the interim, the entire concentrator system remains motionless for approximately 15 milliseconds until network control 25–18 completes its function.

The customer at substation 25–22 is now provided with a path through the remote primary and secondary concentrators to the central office. These crosspoints (as shown in Harr et al.) are much faster in operation than the control pulses which energize them. In consequence, when network control 25–18 has completed its function the circuit is already established. Common control now actuates the central office distribution network 25–35 to effect a connection between trunk 25–12 and a digit detector 25–36 which can receive alternating-current dial pulses. The subscriber keys the desired called directory number into the digit detector 25–36 which transfers it to common control.

The sequence control 25–15 is automatically reenergized if no other flag-producing conditions exist and resumes transmission of advance pulses. Common control through its own program makes the necessary translation from the received directory number digits to establish the terminating station equipment number. In the assumed illustration the common control will arrive at a translation representing the equipment number of called substation 25–23. Preparations are now made to establish a terminating call to that station.

(3) *Terminating connection to called customer.*—As a result of the translation, information pertaining to the concentrator group number, secondary number, primary number and line number of the called station will be obtained. Common control now selects the line number and gates that number into a register within common control referred to as the line match register. This number is a six-bit binary number corresponding to line number *k*. Common control arranges for the line number counter 25–13 to stop at a number equivalent to line number *k*. This is necessary since the network selector (not shown—see FIG. 1) in the primary is controlled by the line number counter in the primary.

Having stored the six-bit number in the line match register 25–24, common control now directs control selector 25–20 to request line number match 25–14 to effect a match between the number stored in the line match register 25–24 and that stored in line number counter 25–13.

A match is effected between the number stored in the flip-flops of the line match register and the number stored in the line number counter 25–13, as explained in detail in the Harr et al. application. The necessity for advising control selector 25–20 to initiate a specific match is that line number match 25–14 will constantly be producing match conditions between a number (which always remains) in the line match register 25–24 and the number stored in the line number counter 25–13.

When the counter arrives at the number representing line number *k* after an average waiting time of approximately 60 milliseconds, an output is produced in line number match 25–14 and delivered to sequence control 25–15 which will send a flag indication to common control Again the entire concentrator system remains static until common control observes the flag indication.

To identify the origin of the flag indication, common control directs the office scanner 25–21 to proceed through its scheduled scanning cycle of the various flip-flops which might have produced it. The office scanner 25–21 informs common control that a match has been effected. In this case office scanner 25–21 is physically observing a flip-flop in line number match 25–14 signifying a requested match condition between line match register 25–24 and line number counter 25–13.

Common control refers to its memory wherein there was previously stored the translated number signifying the equipment designation of substation 25–23. In addition, common control determines from the switching memory whether the called station is recorded as a working number for any other connection. This is, in effect, a busy test. If the busy test indication is positive, calling substation 25–22 is given a busy tone, the match condition is cleared and the concentrator system disregards the call entirely and proceeds on its regular cycle.

If substation 25–23 is not listed in the switching memory as being active, it is presumed to be idle. There is still a possibility, however, that substation 25–23 might have gone off-hook during the last cycle of the line scanner. Information to this effect must be acquired by common control to prevent ringing while the customer has the receiver to his ear. Just before the connection is established for the terminating portion of the call the office scanner 25–21 is advised to make a directed scan, i.e., not to proceed through all of the usual supervisory points but to proceed directly to the service request output of the primary control for the subscriber being called. If a service request is detected the call is nevertheless completed but no ringing takes place.

If the line 25–23 is still on-hook, common control examines its switching memory to select an appropriate link and trunk for the connection. Once the decision is arrived at, it records the allocated link and trunk in the switching memory and sends corresponding information to remote network control 25–18. A further signal is delivered to control selector 25–20 to initiate transmission of signaling by remote network control 25–18.

Common control now resets the flip-flop in line number match 25–14 which created the flag condition. When remote network control 25–18 completes transmission of the information stored therein, sequence control 25–15 is permitted to resume transmission of advance pulses and the RCC returns to its usual cycle. In the interim, common control has instructed the distribution network 25–35 to establish a ringing connection to the called substation 25–23 in the manner explained in the application of Harr et al. supra.

Having explained in a general manner the system context in which the present invention may be advantageously utilized, a detailed description of the asynchronous operation of the counter and scanner at the remote primary to avoid the effects of remote equipment reaction time will be explained in detail.

For convenience in cross-reference, the reference designations employed in the application of Harr et al. are utilized unchanged herein in FIGS. 1–3 and 5.

II. DETAILED DESCRIPTION OF ASYNCHRONOUS OPERATION OF SCANNER AND COUNTER

Figure 2:
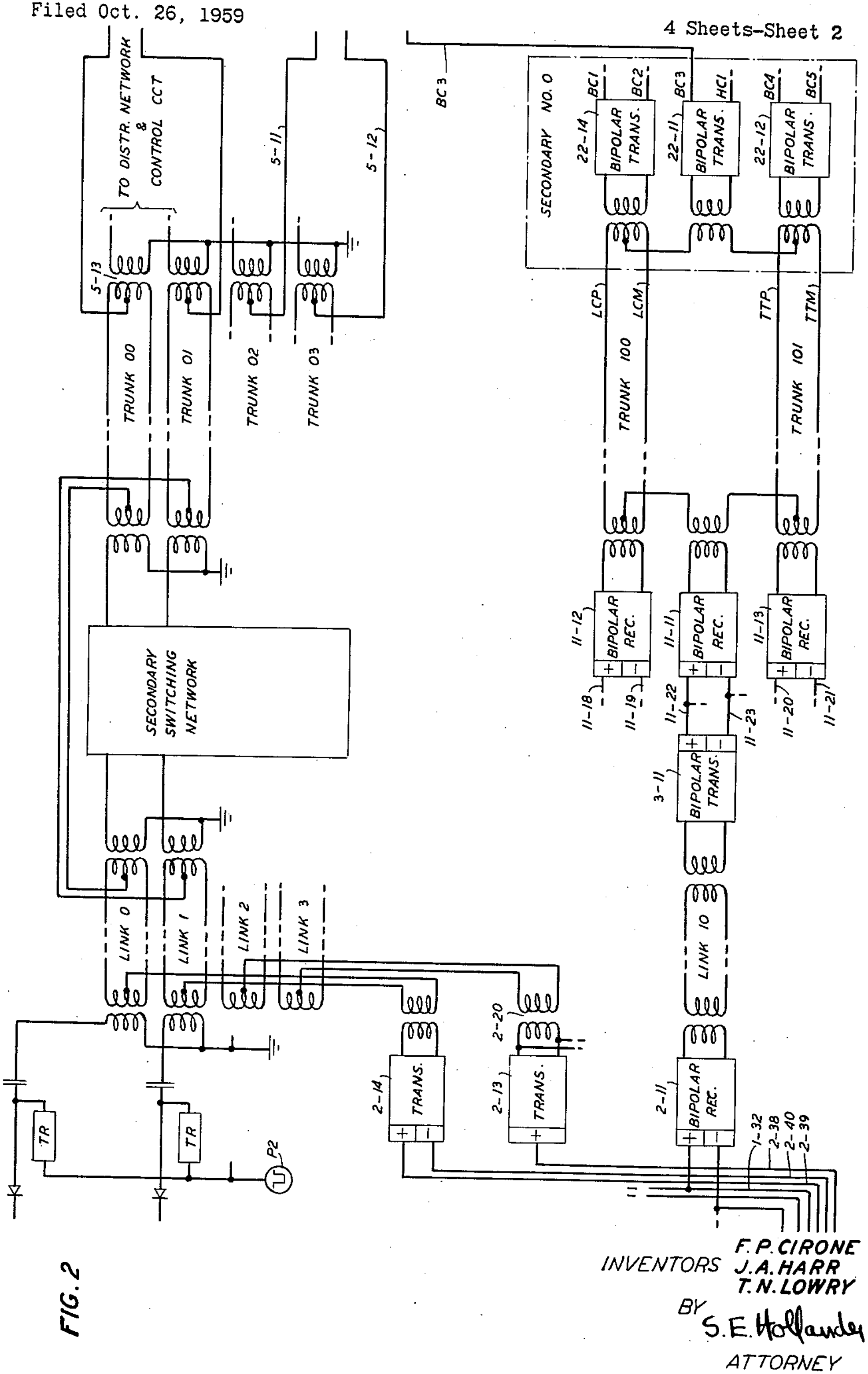
FIG. 2 shows generally portions of the remote secondary concentrator for this embodiment.

The advance pulses generated in the sequence control circuit as explained supra in the copending application of Harr et al. are delivered over leads HB2 and BC3 to transmitter 22–11 (FIG. 2). In the transmitter, the advance pulse is converted from an illustrative 250-microsecond square wave to a pulse suitable for transmission to the remote primary with minimum interference.

Thus, the advance pulse may be traced from the sequence control, conductor HB2, conductor BC3, transmitter 22–11 and in phantom over trunks 100 and 101. These trunks are reserved for control signaling functions and are not associated with any speech path. The phantom circuit on trunks 100 and 101 terminates in FIG. 2 at bipolar receiver 11–11. This receiver restores the negative advance pulse to its original square wave shape. The output from receiver 11–11 passes over conductors 11–22 and 11–23 where it is connected in multiple to transmitters extending over links to each of the remote primaries.

In the illustrative embodiment the transmitter is shown as being extended over link 10 to bipolar receiver 2–11 in remote primary 00 (see FIG. 5 at 25–32). It will be noted that link 10 is reserved for control signaling and that the advance pulses thereon are not phantomed but instead travel over metallic paths.

At receiver 2–11 an output corresponding to a negative input pulse is produced which performs two functions. The output is conveyed over conductor 2–12 where it appears at AND gates 1–11, 1–12 and 1–13. These gates are used to formulate separate supervisory signals which may be transmitted to the central office depending on change of state conditions of the subscriber line. As explained in detail in the Harr et al. application, the signals relate to hangup, answer and service request. In this regard the advance pulse which arrives as a momentary active logic signal serves as a "read-out" signal on gates 1–11 through 1–13. If any supervisory signals exist at these plates, they will be gated out by the advance pulses from receiver 2–11 and transmitted over transmitters 2–14 and 2–13. For example, if a service request condition exists at AND gate 1–11, the advance pulse arriving as explained above will read out the signal and it will be transmitted back to the central office over conductor 2–38, transmitter 2–13, phantom circuits on links 2 and 3, and phantom circuits on trunks 02 and 03 (similar to those shown for links 0 and 1 and trunks 00 and 01) as explained in the Cirone et al. and Harr et al. applications supra.

If either hangup or answer indications are present at the time an advance pulse arrives, activation of either gate 1–13 or 1–12 will activate bipolar transmitter 2–14 via conductors 2–39 and 2–40, respectively, to produce positive or negative pulses. These pulses will be transmitted over phantom circuits on links 0 and 1, and trunks 00 and 01 to the central office.

It will be noted that conductor 2–12 is also connected through delay amplifier 1–14 to counter 1–15 and 1–16 which is situated within the remote primary. The mod 10 counter 1–15 is the units counter of a 60-step counter driven directly by the advance pulses. Each time the mod 10 counter 1–15 passes through 0 a single pulse is delivered to the mod 6 counter 1–16. The line counter is shown symbolically as a stepping switch and may take any suitable form.

Scanner 1–17 is illustratively a two-stage transistor tree but may take any suitable form. For example, in the first stage of the tree, six transistors may be provided and in the second stage of the tree sixty transistors may be provided. The purpose of scanner 1–17 is to provide a temporary connection between the sixty inputs (one from each line to be examined) to the scanner and detector 1–19 and any appropriate circuit may be employed for this purpose.

The line mark selector 1–18 may be similar in structure to the scanner and functions to place marking or controlling voltage on the primary switching network shown in outline form and explained further in the Harr et al. application supra. At the same time the line mark selector 1–18 is being brought into usable proximity with the corresponding terminals of the network representing a line being scanned, the counter 1–15 and 1–16 indicates the number designating that line and the scanner is examining the next succeeding line number. It may be noted in this regard that to address the line mark selector 1–18 to a particular line the entire system is driven to the number representing the line to be addressed.

The advance pulse has now performed two major functions, sampling the supervisory gates 1–11 through 1–13 and stepping the counter 1–15 and 1–16. The cycle is completed when any supervisory signals which may have appeared are transmitted back over phantom channels (traced above) to the central office.

A material advantage of the present invention is rooted in the fact that the scanning element 1–17 is one step ahead of the counter 1–15 and 1–16. Thus, when the advance pulse arrives, the information it reads out was detected and stored during the previous scan period thereby reducing the over-all time required for a scanning cycle.

For example, when the counter 1–15 and 1–16 is up to the count of 37, the line scanner is arranged to examine line 38. Thus, viewed at the instant of time before the advance pulse arrived at the remote primary location, the central office line number counter 25–13 of FIG. 3 reads 38 but counter 1–15 and 1–16 (although designed for synchronous operation therewith) still reads 37 as long as the advance pulse is en route in the cable between the central office and the remote primary of FIG. 1. At this particular instant in time, the line scanner is already examining line 38 producing a situation where the central office line number counter and the line scanner are now in agreement, although the central office counter 25–13 is one step removed from the remote counter 1–15 and 1–16.

Figure 3:
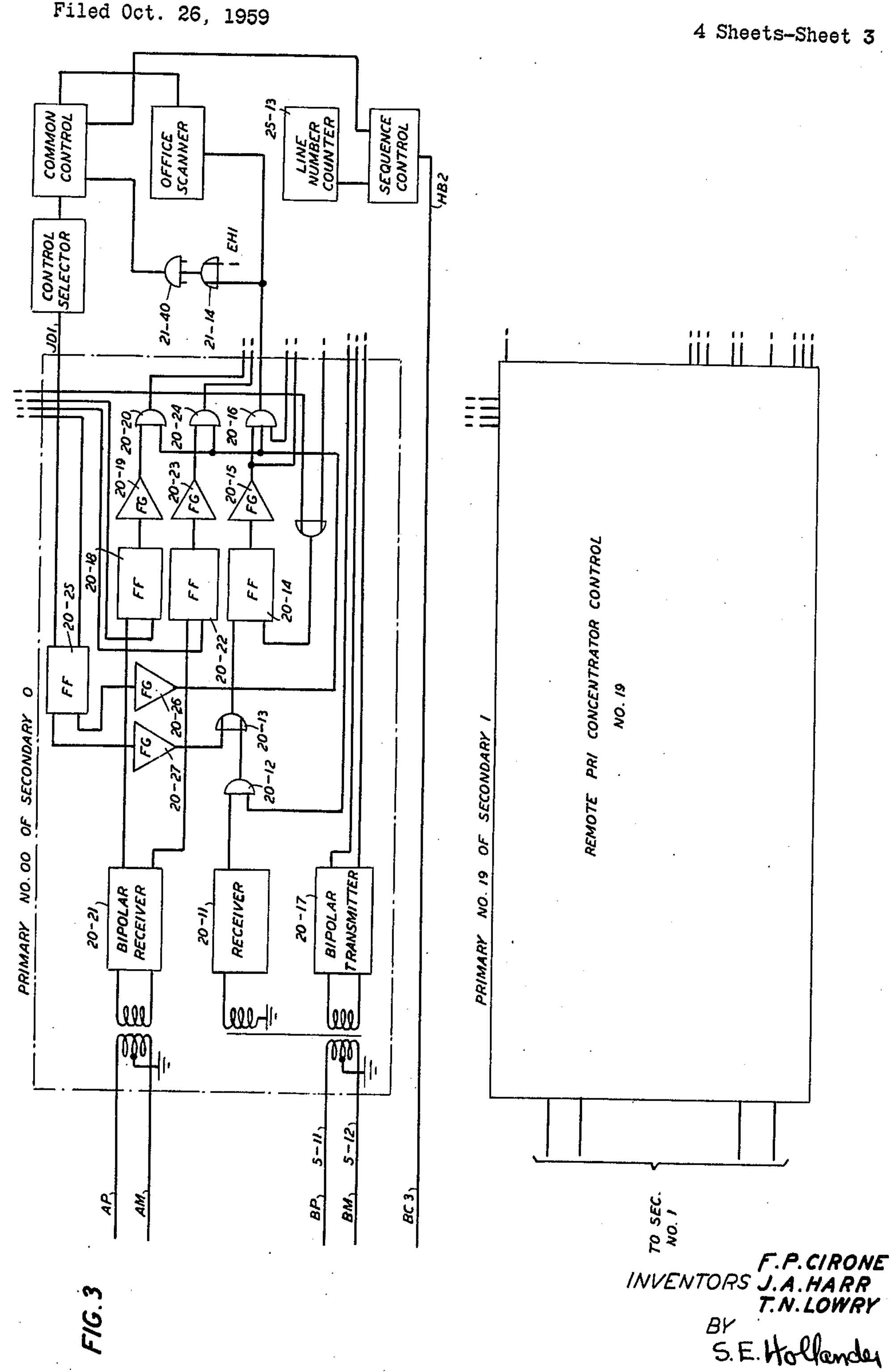
FIG. 3 shows a portion of the equipment in the central office for this embodiment.

When the advance pulse arrives as explained above the information which it reads out from gates 1–11 through 1–13 (explained in detail in the application of Cirone et al. supra) is based on line 38. This information is transmitted back to the central office where, in the case of a service request, flip-flop 20–14 of FIG. 3 is energized, also as explained in detail in the Harr et al. application. Flip-flop 20–14 through amplifier 20–15 and AND gate 20–16 energizes OR gate 21–14 to set a flag condition for common control through AND gate 21–40. In accordance with a prearranged program as explained above the office scanner examines for the cause of the flag condition to common control and observes that a service request indication has been forwarded from primary number 00 of secondary 0. Since the service request indication in flip-flop 20–14 has been forwarded when the office counter registers a count of 38 the information is appropriate and timely.

The delay interposed in the form of amplifier 1–14 prevents the advance pulse from the sequence control from stepping counter 1–15 and 1–16 until the supervisory gates 1–11 through 1–13 have been read out as explained in the application of Cirone et al. When the counter 1–15 and 1–16 is stepped by the advance pulse after the predetermined delay the information is complete since the supervisory signals, i.e., service request indication, hangup, answer, etc., transmitted to the central office represented line 38, the office counter 25–13 reads 38 and the remote counter 1–15 and 1–16 reads 38 thereby permitting any switching action necessary to be taken with regard to line 38 by the line mark selector 1–18 which also is connected to line 38.

Consistent with the foregoing, it will be appreciated that at the expiration of the predetermined delay when the line counter 1–15 and 1–16 was advanced to position 38, the line scanner which is constantly one position in advance of the counter 1–15 and 1–16 has succeeded to line 39. Thus the line number counter 1–15 and 1–16 is adapted to operate in synchronism with the line mark selector 1–18 and the line number counter 25–13 in the central office but all of the foregoing elements are one step in the cycle behind the line scanner 1–17.

As a result of operating the line scanner 1–17 one step ahead of the line number counter, the line scanner is permitted to examine the condition of a particular line sufficiently in advance of an interrogation of the state condition of the line to allow the detector 1–19 to develop a characteristic indication of the presence or absence of P1 or P2 pulses appearing at the terminal of the line being scanned as explained comprehensively in the application of Cirone et al.

Thus the arrangement has obviated the difficulties occasioned by the reaction delays of the equipment at the remote concentrators by scanning in one time position and having the information thereby acquired transmitted to the central office in a separate time position.

It is understood that the foregoing explanation is merely illustrative and that various modifications may be made by those skilled in the art without departing from the scope of the invention.

What is claimed is:

1. In a telephone concentrator system, a central office, a plurality of lines, a plurality of links connected to said central office, a remote switching network connecting said lines and said links having a line marking terminal for each of said lines, a line scanner connectable to said lines for cyclically determining the service condition thereof, a line mark selector for marking any one of said line marking terminals including means for cyclically preparing said terminals for marking, and a pulse source for cyclically operating said scanner one step in advance of said preparing means whereby said scanner determines the condition of any one of said lines at the same time said preparing means prepares said marking terminal associated with the preceding one of said lines in the scanning cycle.

2. In an automatic telephone system, a central office, a plurality of lines, a plurality of links connected to said central office, a remote concentrator network connecting said lines and said links, a line scanner having a terminal position individually connected to each of said lines for cyclically determining the state condition of said lines, a line counter at said concentrator operative to advance in discrete steps in conjunction with said scanner, said counter being adapted to register the number designation of said lines sequentially, and means for advancing said scanner simultaneously with and one step in advance of said counter.

3. In a telephone line concentrator system, a central office, a plurality of lines, a smaller plurality of links connected to said central office, a remote concentrator for connecting said lines to said links, counting means in said remote concentrator adapted to operate in discrete fashion in accordance with control signals from said central office, counting means in said central office adapted to operate in synchronism with said remote counting means, and scanning means in said remote concentrator connectable to each of said lines and responsive to said control signals to advance simultaneously with said counting means, said scanning means being effective to connect to a particular line when said counting means indicate the designation of another line.

4. An automatic telephone line concentrator system including a central office, a plurality of lines, a lesser plurality of links connectable to said central office, remote concentrator means for connecting said lines to said links, a line scanner at said concentrator having line terminals individually connected to each of said lines, counting means at said remote concentrator and at said central office, and means at said central office for transmitting control signals to said concentrator to operate said counting means in synchronous discrete fashion and to simultaneously operate said scanner one step cycle in advance of said counting means.

5. A telephone system including a central office, a plurality of links connectable to said central office, a greater plurality of lines, a remote concentrator for connecting said lines to said links, counting means at said remote concentrator and counting means at said central office adapted to sequentially indicate a count representative of the designation of a particular line, scanning means at said remote concentrator having a plurality of terminals individually connected to said lines, and means at said central office for periodically transmitting control signals to said remote concentrator for cyclically advancing said counting means in synchronous fashion and for simultaneously advancing said scanning means with respect to said counting means, said scanning means being effective to advance to a terminal connected to a particular line when said counting means are indicating the number designation of a different line.

6. In a telephone system, a central office, a plurality of trunks connected to said central office, a greater plurality of links, a still greater plurality of lines, primary concentrator means for connecting said lines to said links, secondary concentrator means for connecting said links to said trunks, counting means at said primary concentrator means and at said central office adapted to operate in cyclical fashion to indicate the designation of a particular line, scanning means at said primary concentrator means adapted to operate in cyclical fashion to connect to each of said lines individually, and means at said central office for transmitting control signals to said primary concentrator means to advance said counting means in synchronous relation with respect to each other and to advance said scanning means simultaneously with respect to said counting means, said scanning means being operative to connect to a particular one of said lines when said counting means are indicating the designation of a different line.

7. In a telephone system, a central office, a plurality of trunks connected to said office, a greater plurality of links, a still greater plurality of lines, primary concentrator means for connecting said lines to said links, secondary concentrator means for connecting said links to said trunks, counting means at said primary concentrator means and at said central office each adapted to operate in cyclical fashion to indicate the number designation of said lines, a scanner at said primary concentrator means adapted to operate in cyclical fashion to connect to each of said lines individually, and means at said central office for advancing said counting means cyclically in synchronous relation with regard to each other and for advancing said scanner one step cycle in advance of said counting means, said scanner being adapted to connect to a particular line when said counting means are indicating the number designation of the line to which said scanner was previously connected.

8. A remote concentrator telephone system including a central office, a plurality of trunks connected to said office, a greater plurality of links, a still greater plurality of lines, primary concentrator means for connecting said lines to said links, secondary concentrator means for connecting said links to said trunks, counting means at said primary concentrator means and at said central office operative in cyclical order to indicate by the count therein the number designation of each of said lines, scanning means at said primary concentrator means connectable to each of said lines individually in cyclical order, detector means connected to said scanning means, means at said central office for transmitting control signals to said primary concentrator means to advance said counting means synchronously in relation to each other and to interrogate said detector means, and means at said primary concentrator means for delaying the application of said control signals to said counting means pending said interrogation of said detector means.

9. A remote concentrator telephone system in accordance with claim 8 wherein said scanning means are adapted to operate one step cycle in advance of said counting means in response to said control signals.

10. A remote telephone concentrator system including a plurality of lines, a plurality of links, a central office, said links being connectable to said central office, concentrator means for connecting said lines to said links, counting means at said concentrator means and at said central office for cyclically advancing in discrete steps to register the number designation of said lines, scanning means at said concentrator means having terminals individually connected to each of said lines, a line mark selector at said concentrator means having terminals individually connected to each of said lines, and means at said central office for transmitting control signals to said concentrator means to advance said counting means and said line selector in synchronous interrelation and for advancing said scanning means in simultaneous relation with respect to said counting means and said selector, said scanning means being operative to advance to a terminal connected to a particular line when said counting means and said selector respectively indicate the number designation of and is connected to a different line.

11. A telephone concentrator system including a number of lines, a lesser number of links, remote concentrator means for connecting said lines to said links, a central office, said links being connectable to said central office, counting means at said remote concentrator means adapted to cyclically register the number designation of said lines, scanning means at said remote concentrator means sequentially connectable to each of said lines to examine the state condition thereof, line selector means at said remote concentrator means individually connectable to each of said lines to apply marking potentials thereto, and means at said central office for transmitting interrogation signals to said remote concentrator means to cyclically advance said counting means and said line selector means in synchronous interrelation and to advance said scanning means on step cycle in advance of said counting means and selector, said scanning means being adapted to examine the state condition of a particular line when said line selector means is connected to the line next preceding in the scanning cycle.

12. A remote concentrator telephone system including a central office, a plurality of links connectable to said office, a greater plurality of lines, switching means for connecting said lines to said links, counting means at said remote concentrator adapted to operate in discrete fashion to register the number designation of said lines, scanning means at said switching means individually connectable to each of said lines in successive order, line mark selector means at said switching means individually and successively connectable to each of said lines for applying marking potentials thereto, detector means connected to said scanning means for interpreting and storing the information derived by said scanning means, interrogation equipment at said central office for transmitting an interrogation signal to said switching means to sample the information stored in said detector means, and means at said remote concentrator for delaying the application of said interrogation signal to said counting means pending the completion of sampling of the information stored in said detector means.

13. In a telephone concentrator system, a central office, a plurality of trunks connected to said central office, a greater plurality of links, a still greater plurality of lines, primary concentrator means for connecting said lines to said links, secondary concentrator means for connecting said links to said trunks, counting means at said primary concentrator means and at said central office for cyclically registering the number designation of each of said lines, scanning means and line mark selecting means each having terminals individually connected to each of said lines, said scanning means being adapted to examine the state condition of said lines, said line mark means being adapted to apply marking potentials to said lines, detecting means connected to said scanning means for interpreting and storing the information derived by said scanning means, and means at said central office for transmitting interrogation signals to said primary concentrator means to read out the information stored in said detecting means including means for immediately advancing said counting means at said central office and for advancing said counting means at said primary concentrator means after a predetermined delay sufficient to permit reading out of said detecting means, said line mark selecting means being adapted to operate in synchronous relation with said counting means and said scanning means being adapted to operate in simultaneous relation with respect to said counting means and said selecting means, said scanning means being effective to advance to a terminal connected to a particular line when said counting means are designating the line identification of another line.

14. A telephone remote concentrator system in accordance with claim 13 wherein said scanning means is adapted to operate one step cycle in advance of said counting means and said line mark selecting means to scan the condition of a particular line at the same time that said counting means in said primary concentrator means registers the designation of a preceding line.

References Cited in the file of this patent

UNITED STATES PATENTS

| | | |
|---|---|---|
| 2,068,726 | Wochinger | Jan. 26, 1937 |
| 2,715,658 | Dunlap et al. | Aug. 16, 1955 |
| 2,812,385 | Joel et al. | Nov. 5, 1957 |
| 2,853,553 | Almquist et al. | Sept. 23, 1958 |
| 2,908,765 | Gatzert et al. | Oct. 13, 1959 |